A. P. BOYER.
COOKER.
APPLICATION FILED SEPT. 2, 1909.
1,111,130.
Patented Sept. 22, 1914.
3 SHEETS—SHEET 3.
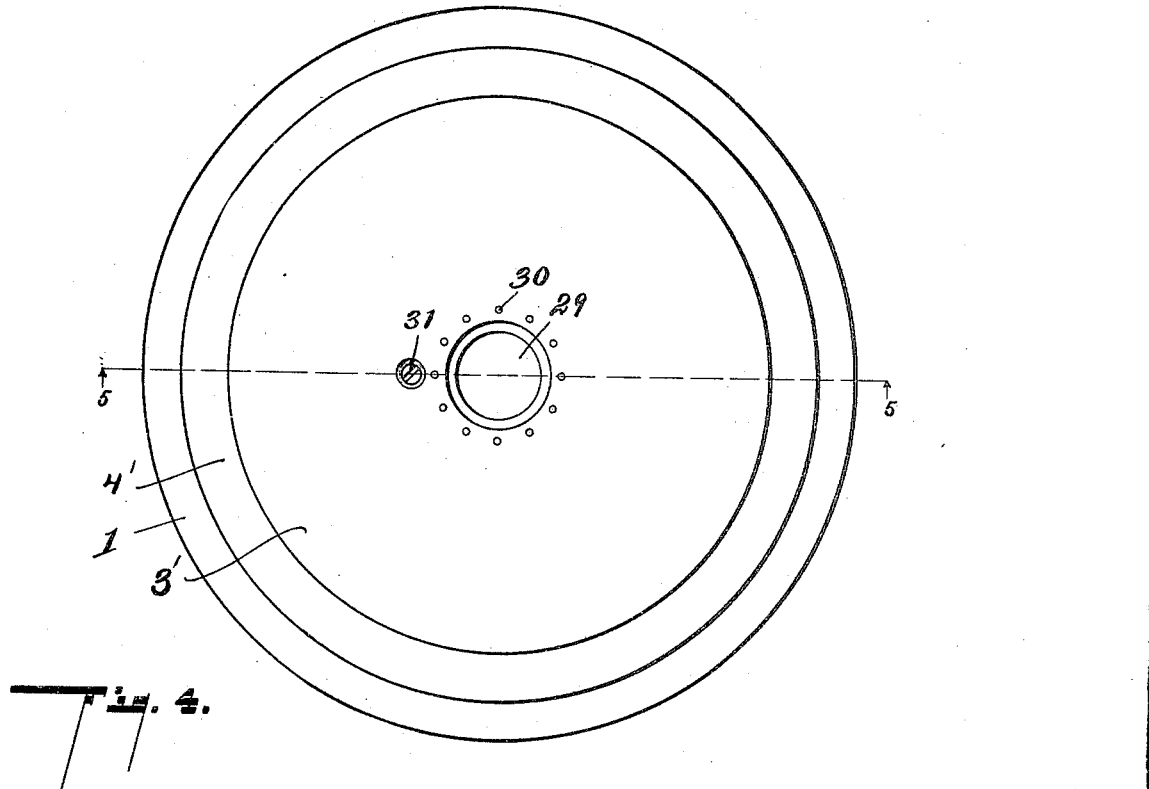
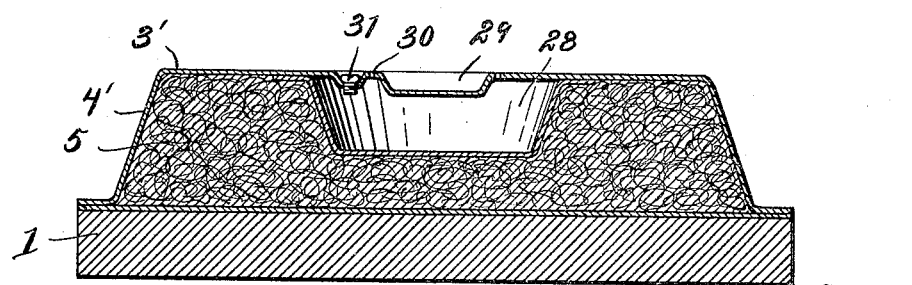

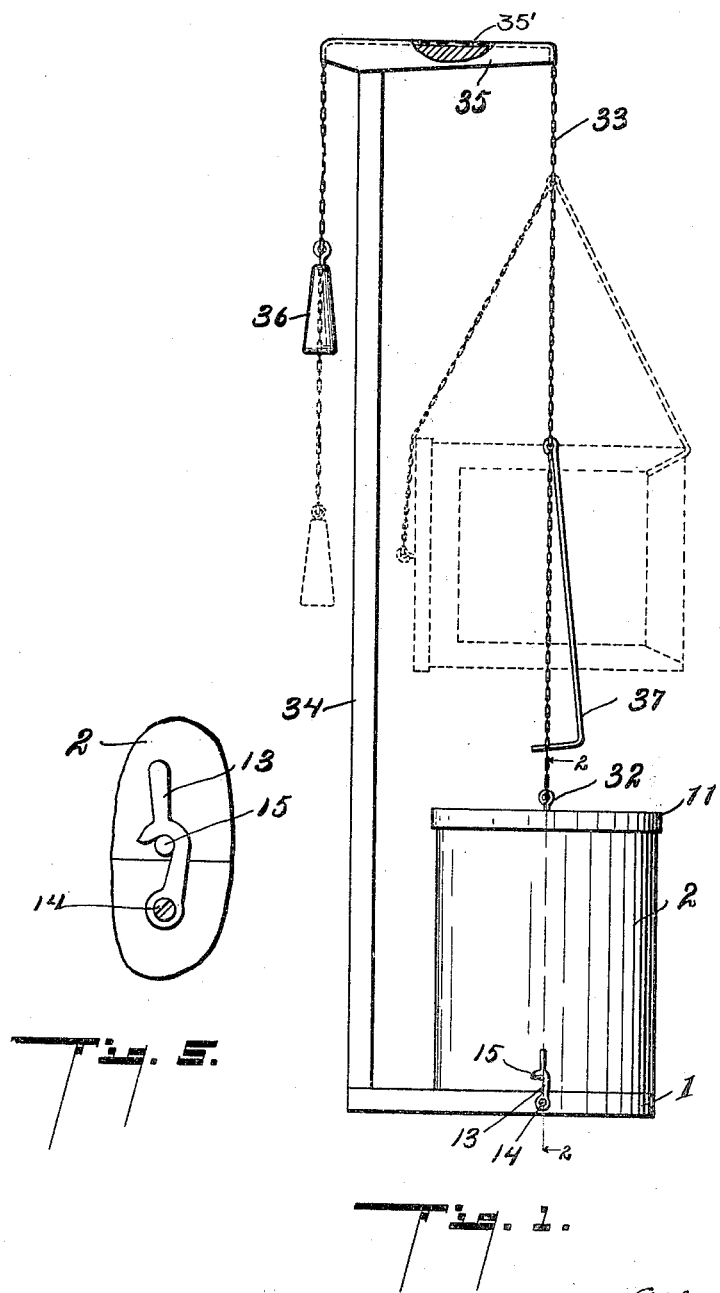

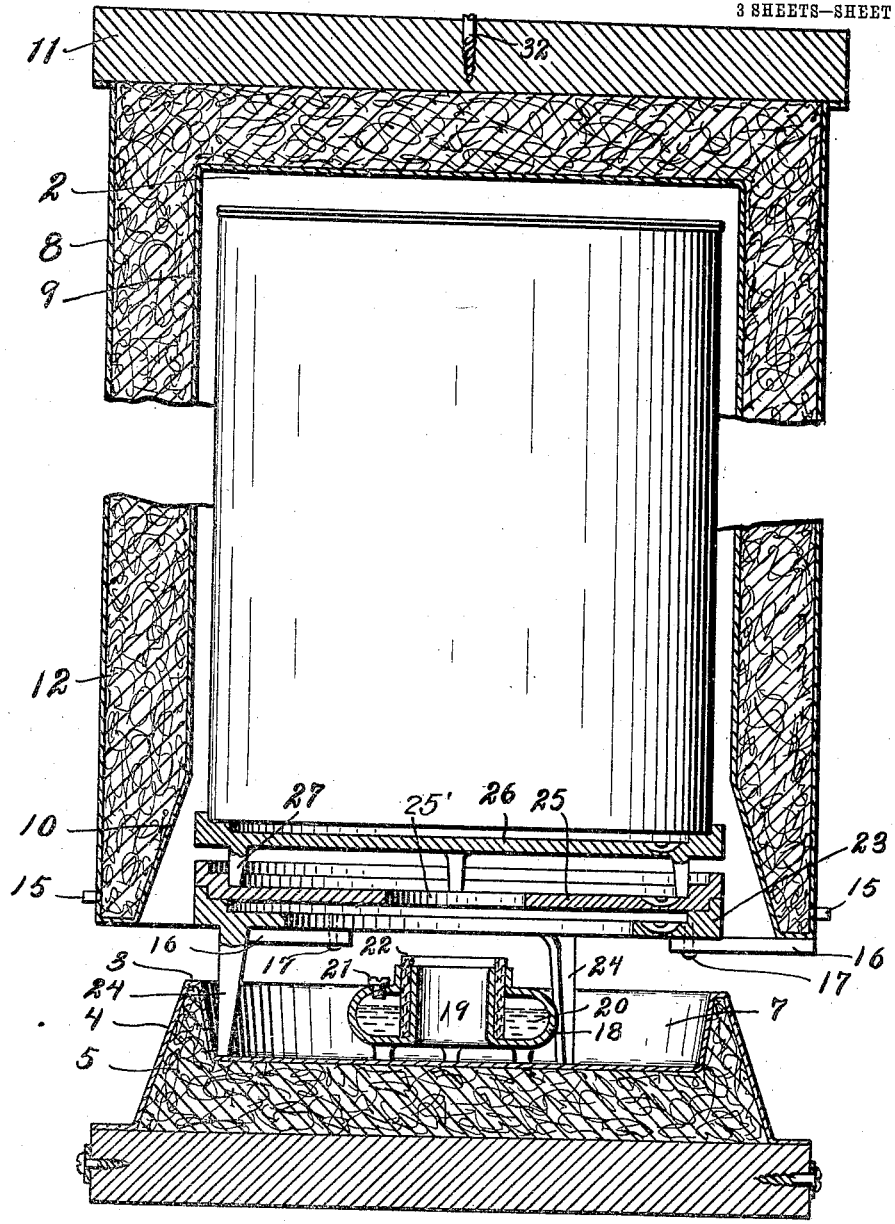

UNITED STATES PATENT OFFICE.

ALLEN P. BOYER, OF GOSHEN, INDIANA.

COOKER.

1,111,130.

Specification of Letters Patent. Patented Sept. 22, 1914.

Application filed September 2, 1909. Serial No. 515,893.

*To all whom it may concern:*

Be it known that I, ALLEN P. BOYER, a citizen of the United States, residing at Goshen, Elkhart county, Indiana, have invented certain new and useful Improvements in Cookers, of which the following is a specification.

This invention relates to improvements in cooking devices, which are designed to cook mainly by retained heat but which devices are provided with self-contained fuel burners.

The objects of this invention are: First, to provide a complete and self-contained cooking apparatus, which, after the generation of heat by a burner entirely within the same, can be closed and retain the heat to effect the cooking by the retained heat. Second, to provide an improved construction of heat-retaining device in which the heat will be naturally and effectively retained because of its reduced specific gravity, the same being retained in an appropriate dome bell or inverted receptacle. Third, to provide an improved construction whereby heat-retaining bodies and articles to be cooked are heated in place within the cooker, the main portion of the cooker being of the inverted receptacle type, whereby the heat is effectively retained. The said heating plates, spiders or griddles are nested together whereby they can be separated and placed above and below any cooking utensil that is placed within the cooker. A fourth object is to provide an improved construction of cooker in which the dome of the cooker is readily adjustable up and down and can be properly inclined to insure ventilation and drying of the same, and hence insure good sanitation. A fifth object is to provide an improved cooker whereby a volatile fuel, such as alcohol can be made use of in a self-contained cooker in which the cooking operation will be completed by the proper devices for retaining the heat. It is also an object to provide a self-contained cooker with heat retaining means embracing a burner to generate the heat.

Objects which relate to details of construction will definitely appear from the detailed description to follow.

I accomplish the objects of my invention by the devices and means described in the following specification.

The structure described constitutes one effective embodiment of my invention. Other embodiments will be readily devised by those skilled in the art.

The invention is clearly defined and pointed out in the claims.

A structure constituting an effective and preferred embodiment of my invention is clearly illustrated in the accompanying drawing, forming a part of this specification, in which:

Figure 1 is a side elevation of my improved cooker, the shifted position of certain of the parts being indicated by dotted lines. Fig. 2 is a vertical central sectional elevation through a cooker embodying the features of my invention, taken on a line corresponding to line 2—2 of Fig. 1. Fig. 3 is a detail sectional view through the base and a modification of my improved burner, taken on a line 5—5 of Fig. 4. Fig. 4 is a plan view of the modification of the burner appearing in Fig. 3. Fig. 5 is a detail view of one of the locking hooks for locking the dome part of my improved cooker onto the base, and thus effectively locking the same closed.

In the drawing, the sectional views are taken looking in the direction of the little arrows at the ends of the section lines, and similar numerals of reference refer to similar parts throughout the several views.

Referring to the drawing, the base 1 is usually a round board or plank on which is supported the bottom, which is conical on its exterior surface at 4 to receive the dome-shaped heat-retaining chamber 2, which is beveled at 10 to correspond thereto. This base is a metal shell, having a depression 7 in the center, surrounded by the annular ring 3, projecting well up into the chamber 2. The depression at the center is to receive and accommodate the alcohol burner 18. This metal shell is filled with an insulating material 5, which is preferably asbestos, or mineral wool.

The main part of the cooker 2 is an inverted receptacle which I call a dome, made up of an upper shell 8, which is secured to a top 11, which is here illustrated as of plank, though a metal top would serve the purpose just as well. The chamber between the outer and inner walls is filled with mineral wool, or similar effective insulating material 12. The space may be a vacuum and serve the purpose.

The dome part of the cooker drops onto the lower part and is retained in place by hooks 13, which are pivoted at 14 to the base, and engages pins 15 on the dome. There are two or more hooks to insure a full locking of the dome in place, so that it will be possible to generate considerable pressure inside and thereby increase the heat much above the boiling point.

The fuel I use is preferably denatured alcohol, which I use in the specially constructed burner, which is of the form preferably appearing in Fig. 2.

The upper dome part I preferably support by a suitable counterbalance, hereinafter to be described, but it can also be supported by pivoted fingers 16, which are pivoted at 17 to the under side of the spider 23,—see particularly Fig. 2. Three of these fingers are provided to swing out and support the dome of the heater in place.

The burner which I preferably use in this device is an alcohol burner 18 of the kind appearing in Fig. 2. This has a central ventilating tube or chimney 19, surrounded by a metal reservoir 20, which extends up into a tube in proximity to the ventilating chimney 19, forming a space for the wick 22, which wick is preferably of asbestos or mineral wool. The hole to fill the reservoir 20 is plugged by the screw 21, as appears in said Fig. 2 As this burner is placed in the broad depression 7 and the upper part of the cooker is supported above the same, the air to supply and maintain combustion circulates readily to the lamp and the heat therefrom is delivered up centrally into the dome of the cooker. A ring spider 23 is provided, having suitable legs 24 which rest upon the base and form an air space to admit air to supply and maintain combustion. Resting upon this ring 23 are other spider rings 25 and 26, the ring 26 being provided with legs 27 to separate it from the said ring 25 to permit a free circulation of the flame and heated products from the burner below. These spiders also constitute the hot plates or heating bodies of the cooker and are used, after they have been heated, exactly the same as the heat-retaining bodies in the ordinary fireless cooker, being of the form that appears here, after the charge of denatured alcohol has been burned and the parts properly heated, the upper part of the cooker is raised up and the contents rearranged and a hot plate placed on top, where that is desired.

Of course, where the article of food to be cooked is some simple vegetable which requires merely stewing, or a mush, which requires merely the stewing and the boiling, the heating bodies can be eliminated and less alcohol or fuel can be made use of, merely enough to heat the interior of the dome and the article to be cooked, thereby greatly economizing where this result is desired. Where, however, it is desired to do baking and browning, as in the baking of bread, of course, the heating bodies must be made use of and properly distributed in relation to the contents of the cooker.

I preferably provide a counterbalancing means for the dome part of my improved cooker, consisting of a standard 34 and cross arm 35, and a chain or cable 33 is connected to an eye 32 in the top of the dome and is provided with a counterbalance weight 36, which causes the cable or chain to play through a groove 35' and retain the same in place or position by friction. By this means, a comparatively light weight 36 serves to counterbalance the dome of the cooker, so that it can be readily raised and adjusted. A hook 37 is secured to the chain or cable a little above the cooker so that the dome can be raised to the horizontal position and retained there as indicated by the dotted lines in Fig. 1. This permits the heat to escape and the cooker to dry, thereby insuring a sanitary condition.

In Figs. 3 and 4 I have shown a modified form of the base and burner in which the base plate 1 is provided with a metal shell having the side member 4' and the disk like top 3'. This metal shell is filled with an insulating material 5, which is preferably asbestos or mineral wool. The disk like top 3' is provided with a central depression 29 and a plurality of perforations 30 are arranged in said top 3' in a circle concentric with the depression 29. To one side thereof is provided an opening closed by the screw plug 31. Beneath the central depression there is arranged in the heat retaining chamber formed by the outer metal shell and the insulating material, a cup 28 which is filled with alcohol or the hydrocarbon fuel which is used for the burner. This modification shows an arrangement of base and burner which may take the place of that shown in Fig. 2.

It will be seen from the description that I have given that my improved cooker consists of a base portion, which carries a suitable burner, preferably for denatured alcohol, although any proper fuel can be made use of, even charcoal. The spiders or plates, which also serve as heat-retaining and distributing bodies, insure the full utilization of the heat developed. The plate 25 is provided with a central opening 25', so that the flame and heat from the burner readily pass up and thoroughly heat these parts, and thoroughly heat any article of food or cooking utensil that is placed within the dome above. These various rings are provided with concentric seats, so that they center themselves in place to receive the dome part of the cooker above, without moving the same unnecessarily, and they also support the cooking utensil in proper position to be most effectively heated. These rings are quite a little elevated and quite effectively secure a high temperature, and maintain the same, for baking and the like. The rings and spiders are preferably provided with slots to be handled with any stove lid lifter. The burner will be effective with fewer rings and with simple flat plates arranged above the same, but the form which I have illustrated, is very effective because the heated products of combustion pass all through the devices, and very quickly raise them to a temperature sufficiently high for the purpose.

As before remarked, where it is simply desired to stew some article of food, that can be accomplished with the rings entirely omitted, except a convenient support to secure the necessary ventilation for the burner, and for many purposes the cooker would be found to be effective without any rings or plates at all on this account. This is especially so, when it is borne in mind that the interior of the dome of the cooker is thoroughly heated by the rising products of combustion from the flame of the burner.

I have designed my improved structure specially for the use of denatured alcohol, as fuel, and find the same to be very effective, as the fuel is effectively consumed, and no odor is carried to the contents of the cooker. Other fuels may be made use of by taking great care to have the combustion complete, and, while I wish to claim my device as a special structure adapted for the use of denatured alcohol as a fuel, I also desire to claim the structure broadly for use with fuels of any description. I also desire to comment that alcohol fuels are put up in various forms, there being means for solidifying alcohol, so that a special burner is not really required therefor, and I wish it to be understood that my claim is broadly to any fuel adapted for use in this relation.

While it is much to be preferred to place a charge of fuel in the cooker of the right size to accomplish the particular cooking, I desire to comment that that is not really necessary, because, if the parts become effectively heated before the fuel is entirely consumed, it is not necessary to wait for the consumption of the alcohol or other fuel, but the dome can be closed and the flame will be immediately extinguished without any serious consequences.

Having thus described my invention, what I claim as new and desire to secure by Letters Patent is:—

1. In a cooker, the combination of a suitable insulated base, having a central depression and conical exterior; an alcohol burner, arranged on the said base; suitable spiders or heat plates with supporting legs the lower of which rests on the said base and containing passage ways, which plates are suitably conformed to receive and support a cooking utensil; a dome consisting of an inner and outer shell of metal with suitable insulation between, conformed to fit the conical exterior of said base; means of supporting the said dome above the said base for the admission of air to the burner and for circulation of the products of combustion; a counterbalance consisting of a weight and connecting cable or chain, connected to the central part of the dome of said heater; and a hook secured to the said cable above the said heater and arranged to engage the bottom of the said dome to hold it in a horizontal position when elevated, all coacting substantially as described and for the purpose specified.

2. In a cooker, the combination of a suitable insulated base, having a central depression and conical exterior, an alcohol burner, arranged on the said base; suitable spiders or heat plates with supporting legs the lower of which rests on the said base, which plates are suitably conformed to receive and support a cooking utensil; a dome consisting of an inner and outer shell of metal with suitable insulation between, conformed to fit the conical exterior of said base; a counterbalance consisting of a weight and connecting cable or chain, connected to the central part of the dome of said heater; and a hook secured to the said cable above the said heater and arranged to engage the bottom of the said dome to hold it in a horizontal position when elevated, all coacting substantially as described and for the purpose specified.

3. In a cooker, the combination with a suitable base; of a suitable burner arranged on said base; suitable spider or heat plates with supporting legs the lower of which rests on the said base and arranged above the said burner; a heat-retaining dome fitted to the said base; a counterbalance for the said dome consisting of a suitable weight and cable connected thereto; and a hook secured to the said cable above said dome and arranged to engage the bottom of said dome to hold it in horizontal position, when elevated, all coacting for the purpose specified.

4. In a cooker, the combination with a suitable base, of a suitable burner arranged on said base; a heat-retaining dome fitted to the said base; a counterbalance for the said dome consisting of a suitable weight and cable connected thereto; and a hook secured to the said cable above said dome and arranged to engage the bottom of said dome to hold it in horizontal position when elevated, all coacting for the purpose specified.

5. In a cooker, the combination with a suitable base, of a suitable burner arranged on said base; a heat-retaining dome fitted to the said base; means of supporting a cooking utensil in said dome; a counterbalance for the said dome consisting of a suitable weight and cable connected thereto; and a hook secured to the said cable above said dome and arranged to engage the bottom of said dome to hold it in horizontal position when elevated, all coacting for the purpose specified.

6. In a cooker, the combination with a suitable insulated base, of a heating means; a heat-retaining dome fitted to the said base; a counterbalance for said dome; and means for adjusting the said dome in a horizontal position, coacting for the purpose specified.

In witness whereof, I have hereunto set my hand and seal in the presence of two witnesses.

ALLEN P. BOYER. [L. S.]

Witnesses:
CLORA E. BRADEN,
F. GERTRUDE TALLMAN.

Copies of this patent may be obtained for five cents each, by addressing the "Commissioner of Patents, Washington, D. C."